United States Patent
Huusken (10) Patent No.: US 11,211,612 B2
(45) Date of Patent: Dec. 28, 2021

(54) WATER LOSS REDUCING PASTING MATS FOR LEAD-ACID BATTERIES

(71) Applicant: Owens Corning Intellectual Capital, LLC, Toledo, OH (US)

(72) Inventor: Robert Huusken, Oldenzaal (NL)

(73) Assignee: Owens Corning Intellectual Capital, LLC, Toledo, OH (US)

(*) Notice: Subject to any disclaimer, the term of this patent is extended or adjusted under 35 U.S.C. 154(b) by 318 days.

(21) Appl. No.: 15/316,238

(22) PCT Filed: Jun. 17, 2015

(86) PCT No.: PCT/US2015/036141
§ 371 (c)(1),
(2) Date: Dec. 5, 2016

(87) PCT Pub. No.: WO2015/195742
PCT Pub. Date: Dec. 23, 2015

(65) Prior Publication Data
US 2017/0194649 A1 Jul. 6, 2017

Related U.S. Application Data

(60) Provisional application No. 62/013,099, filed on Jun. 17, 2014.

(51) Int. Cl.
| | |
|---|---|
| *H01M 4/56* | (2006.01) |
| *H01M 4/62* | (2006.01) |
| *H01M 10/06* | (2006.01) |
| *H01M 10/10* | (2006.01) |
| *H01M 4/38* | (2006.01) |

(52) U.S. Cl.
CPC ............ *H01M 4/628* (2013.01); *H01M 4/38* (2013.01); *H01M 4/56* (2013.01); *H01M 10/06* (2013.01); *H01M 10/10* (2013.01)

(58) Field of Classification Search
CPC .......... H01M 4/628; H01M 4/38; H01M 4/56
See application file for complete search history.

(56) References Cited

U.S. PATENT DOCUMENTS

| 3,862,861 A | 1/1975 | McClelland et al. |
| 4,455,343 A | 6/1984 | Temple |
(Continued)

FOREIGN PATENT DOCUMENTS

| CN | 1426125 A | 6/2003 |
| CN | 1790776 A | 6/2006 |
(Continued)

OTHER PUBLICATIONS

"Levasil for abrasion & scratch resistance", NOURYON, [online], [retrieved on Aug. 27, 2020]. Retrieved from the Internet:<URL: https://colloidalsilica.nouryon.com/functions/abrasion-scratch-resistance/> (Year: 2020).*
(Continued)

*Primary Examiner* — Tae-Sik Kang
(74) *Attorney, Agent, or Firm* — Calfee, Halter & Griswold LLP (57) ABSTRACT

A non-woven fiber mat for lead-acid batteries is provided. The non-woven fiber pasting mat includes glass fibers coated with a sizing composition; a binder composition; and one or more additives. The additives reduce water loss in lead-acid batteries.

11 Claims, 3 Drawing Sheets

(56) References Cited

U.S. PATENT DOCUMENTS

| | | | |
|---|---|---|---|
| 5,221,587 A | 6/1993 | Bohnstedt et al. | |
| 5,298,348 A * | 3/1994 | Kung | H01M 2/162 |
| | | | 429/101 |
| 5,584,965 A | 12/1996 | Ogata et al. | |
| 5,741,588 A | 4/1998 | Ford et al. | |
| 6,071,641 A | 6/2000 | Zguris | |
| 6,475,676 B1 | 11/2002 | Sawai | |
| 6,746,803 B1 | 6/2004 | Bauer et al. | |
| 7,238,744 B2 | 7/2007 | Yaritz et al. | |
| 7,498,369 B2 | 3/2009 | Whear et al. | |
| 9,190,648 B2 | 11/2015 | Whear et al. | |
| 10,119,025 B2 | 11/2018 | Whear et al. | |
| 2003/0008214 A1 | 1/2003 | Zguris | |
| 2005/0003726 A1 | 1/2005 | Zuris et al. | |
| 2008/0138697 A1 | 6/2008 | Asada et al. | |
| 2009/0124151 A1 * | 5/2009 | Shoemake | C08L 33/08 |
| | | | 442/180 |
| 2010/0004356 A1 | 1/2010 | Yoshinaga et al. | |
| 2010/0178825 A1 | 7/2010 | Shah et al. | |
| 2011/0287324 A1 | 11/2011 | Rajaram et al. | |
| 2012/0058698 A1 * | 3/2012 | Lin | C09D 103/02 |
| | | | 442/108 |
| 2012/0070713 A1 * | 3/2012 | Whear | C08L 89/00 |
| | | | 429/143 |
| 2012/0070747 A1 | 3/2012 | Whear et al. | |
| 2012/0121975 A1 * | 5/2012 | Rajaram | C03C 13/00 |
| | | | 429/203 |
| 2012/0244429 A1 | 9/2012 | Lam et al. | |
| 2012/0270110 A1 | 10/2012 | Waterhouse et al. | |
| 2013/0071734 A1 | 3/2013 | Wertz et al. | |
| 2014/0194020 A1 | 7/2014 | Vliet et al. | |
| 2015/0140404 A1 | 5/2015 | Yoo et al. | |
| 2016/0268567 A1 | 9/2016 | Guo et al. | |

FOREIGN PATENT DOCUMENTS

| | | |
|---|---|---|
| CN | 101034738 A | 9/2007 |
| CN | 101222069 A | 7/2008 |
| CN | 101425570 A | 5/2009 |
| CN | 101459259 A | 6/2009 |
| CN | 101702427 A | 5/2010 |
| CN | 101719564 A | 6/2010 |
| CN | 101851309 A | 10/2010 |
| CN | 202167556 U | 3/2012 |
| CN | 102898573 A | 1/2013 |
| CN | 103000830 A | 3/2013 |
| CN | 103545470 A | 1/2014 |
| EP | 54086 | 6/1982 |
| EP | 96371 | 12/1983 |
| EP | 507090 | 10/1992 |
| EP | 2401782 | 9/2010 |
| EP | 2437343 | 4/2012 |
| GN | 1812179 A | 8/2006 |
| JP | S59-003867 A | 1/1984 |
| JP | 60205963 A | 10/1985 |
| JP | 64006379 A | 1/1989 |
| JP | 2013542558 | 11/2013 |
| WO | 2006019684 A2 | 2/2006 |
| WO | 2010/098796 | 9/2010 |
| WO | 2011/059981 | 5/2011 |
| WO | 2011/133677 | 10/2011 |
| WO | 2012040409 A1 | 3/2012 |
| WO | 2012040436 A1 | 3/2012 |

OTHER PUBLICATIONS

Office Action from Russian Patent Application No. 2017101144 dated Oct. 24, 2018.
Office Action from Russian Patent Application No. 2017101146 dated Oct. 24, 2018.
International Search Report and Written Opinion from PCT/US15/036141 dated Oct. 8, 2015.
International Search Report and Written Opinion from PCT/US15/036142 dated Dec. 3, 20a5.
Office Action from European Patent Application No. 15734756.8 dated Mar. 13, 2019.
Office Action from European Patent Application No. 15745271.5 dated Oct. 5, 2018.
Office Action from Japanese Patent Application No. 2016-573056 dated Jun. 13, 2019.
Office Action from Japanese Patent Application No. 2016-573074 dated Jun. 13, 2019.
Office Action from Chinese Patent Application No. 201580032331.6 dated Dec. 11, 2018.
Office Action from Chinese Patent Application No. 201580032325.0 dated Dec. 17, 2018.
Office Action from U.S. Appl. No. 15/316,235 dated Feb. 7, 2019.
Office Action from U.S. Appl. No. 15/316,235 dated Oct. 3, 2019.
Office Action from Chinese Patent Application No. 201580032325.0 dated Aug. 5, 2019.
Office Action from U.S. Appl. No. 15/316,235 dated Jul. 11, 2019.
Office Action from Chinese Patent Application No. 201580032331.6 dated Jul. 8, 2019.
Office Action from Brazilian Patent Application No. BR112016029519-6 dated Jan. 14, 2020.
Office Action from Chinese Patent Application No. 201580032331.6 dated Nov. 22, 2019.
Office Action from Chinese Patent Application No. 201580032325.0 dated Jan. 2, 2020.
Office Action from European Patent Application No. 15745271.5 dated Feb. 6, 2020.
Office Action from Malaysian Patent Application No. PI 2016704665 dated Feb. 27, 2020.
Office Action from U.S. Appl. No. 15/316,235 dated Apr. 3, 2020.
Office Action from Indian Patent Application No. 201737000954 dated Mar. 18, 2020.
Office Action from Malaysian Patent Application No. PI 2016704664 dated Mar. 19, 2020.
Office Action from Japanese Patent Application No. 2016-573056 dated Jun. 3, 2020.
Office Action from Japanese Patent Application No. 2016-573074 dated Jun. 11, 2020.
Office Action from Brazilian Patent Application No. BR112016029242-1 dated Apr. 21, 2020.
Office Action from Chinese Patent Application No. 201580032331.6 dated Apr. 10, 2020.
Office Action from Chinese Patent Application No. 201580032325.0 dated May 11, 2020.
Office Action from U.S. Appl. No. 15/316,235 dated Sep. 18, 2020.
Office Action from Chinese Patent Application No. 201580032331.6 dated Jul. 30, 2020.
Board Opinion from Chinese Patent Application No. 201580032325.0 dated Nov. 11, 2020.
Office Action from Indian Patent Application No. 201737001098 dated Aug. 28, 2020.
Office Action from Japanese Patent Application No. 2016-573074 dated Jan. 21, 2021.
Office Action from U.S. Appl. No. 15/316,235 dated Mar. 19, 2021.
Office Action from U.S. Appl. No. 15/316,235 dated Jul. 29, 2021.
Office Action from Canadian Patent Application No. 2,952,434 dated Jul. 14, 2021.

* cited by examiner

WATER LOSS REDUCING PASTING MATS FOR LEAD-ACID BATTERIES

RELATED APPLICATIONS

The present application is the U.S. national stage entry of PCT/US15/36141, filed on Jun. 17, 2015, which claims priority to U.S. provisional application No. 62/013,099, filed on Jun. 17, 2014, both of which are hereby incorporated by reference in their entirety.

FIELD

The general inventive concepts relate to lead-acid batteries, and more particularly to the incorporation of active chemistry to address water loss in lead-acid batteries.

BACKGROUND

Lead-acid batteries are among the most commonly used rechargeable batteries due to their ability to supply high currents, while having a relatively low production cost. Lead-acid batteries are largely used in the automotive starting, lighting, and ignition (SLI) sector and in other industrial sectors due to their high discharge capability. Conventional lead-acid batteries include a positive electrode ($PbO_2$ plate) and a negative electrode (spongy Pb plate) immersed in a sulfuric acid electrolyte. A separator may be disposed between the positive and negative plates. Separators function to not only provide mechanical separation between the positive and negative plates, but to also prevent shorting between electrodes and allow ionic conduction. There are many different forms of electrodes. In some instances, the electrodes consist of lead or lead alloy plates having a grid-like structure. An active material paste consisting of lead oxides and sulfuric acid is used to fill the holes in the grid of the positive plate. The active material paste is porous, thereby allowing the acid to react with the lead inside the plate, which increases the surface area of the electrodes. The paste is dried and the positive and negative electrodes are activated by an electrochemical process.

During discharge, the lead dioxide and lead react with the electrolyte of sulfuric acid to create lead sulfate, water, and energy. When the battery is charged, the cycle is reversed and the lead sulfate and water are electrochemically converted to lead, lead oxide and sulfuric acid by an external electrical charging source. If current is being provided to the battery faster than lead sulfate can be converted, a phenomenon called "gassing" begins before all the lead sulfate is converted, that is, before the battery is fully charged. Gassing consists of a side reaction that disassociates the water into hydrogen and oxygen and releases them into the atmosphere. Gassing particularly occurs during excessive charging. Such gassing causes water loss, which can lead to an eventual dry out and decline in capacity. Therefore, conventional lead-acid batteries must be replenished with water periodically.

SUMMARY

Various aspects of the general inventive concepts are directed to a fiber pasting mat for lead-acid batteries. The pasting mat includes a plurality of fibers coated with a sizing composition, a binder composition, and one or more additives, wherein said additives reduce water loss in lead-acid batteries.

In some exemplary embodiments, the binder composition is an acrylic binder, a styrene acrylonitrile binder, a styrene butadiene rubber binder, a urea formaldehyde binder, an epoxy binder, a polyurethane binder, a phenolic binder, a polyester binder, or a mixture thereof.

In some exemplary embodiments, the additives are included in at least one of the sizing composition and the binder composition.

In some exemplary embodiments, the additives include one or more of rubber additives, rubber derivatives, aldehyde, aldehyde derivatives, metal salts, fatty alcohol ethyoxylates (alkoxylated alcohols with terminal OH group), ethylene-propylene oxide block copolymers, sulphate esters (alkylsulphates and alkylether sulphates), sulphonate esters (alkyl and olefin sulphonates), phosphate esters, sulphosuccinates, polyacrylic acid, polyaspartic acid, perfluoroalkylsulfonic acid, polyvinylalcohol, lignin, lignin derivatives, phenol formaldehyde resin, cellulose, and wood flour.

Various aspects of the general inventive concepts are directed to a lead-acid battery that includes at least one positive electrode and at least one negative electrode, both of which are immersed within an electrolyte, and at least one non-woven fiber pasting mat at least partially covering a surface of at least one of the positive and negative electrode. The non-woven fiber pasting mat may include a plurality of glass fibers coated with a sizing composition, a binder composition, and one or more additives, wherein said additives reduce water loss in the lead-acid battery.

Yet additional aspects of the general inventive concepts are directed to a method of forming a non-woven fiber pasting mat for use in a lead-acid battery. The method includes dispersing a plurality of glass fibers into an aqueous slurry. The fibers may be coated with a sizing composition. The binder may then be applied on the deposited slurry after which the binder-coated slurry is heated, thereby curing said binder and forming a non-woven fiber pasting mat. In some exemplary embodiments, the pasting mat includes one or more additives included in at least one of the sizing composition and the binder.

Additional features and advantages will be set forth in part in the description that follows, and in part may be apparent from the description, or may be learned by practice of the exemplary embodiments disclosed herein. The objects and advantages of the exemplary embodiments disclosed herein will be realized and attained by means of the elements and combinations particularly pointed out in the appended claims. It is to be understood that both the foregoing summary and the following detailed description are exemplary and explanatory only and are not restrictive of the general inventive concepts as disclosed herein or as otherwise claimed.

BRIEF DESCRIPTION OF THE DRAWINGS

Example embodiments of the invention will be apparent from the more particular description of certain example embodiments of the invention provided below and as illustrated in the accompanying drawings.

DETAILED DESCRIPTION

Various exemplary embodiments will now be described more fully, with occasional reference to any accompanying drawings. These exemplary embodiments may, however, be embodied in different forms and should not be construed as limited to the descriptions set forth herein. Rather, these exemplary embodiments are provided so that this disclosure will be thorough and complete, and will convey the general inventive concepts to those skilled in the art.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments.

As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The general inventive concepts relate to a non-woven fiber mat, such as a pasting mat or a retainer mat for lead-acid batteries, or other batteries. The non-woven fiber mat may comprise a plurality of reinforcement fibers combined in the form of a sheet. In some exemplary embodiments, the reinforcement fibers are made from glass. However, the reinforcement fibers may also include synthetic fibers, or a combination of glass fibers and synthetic fibers. The term synthetic fiber, as used herein, is intended to include any man-made fiber having suitable reinforcing characteristics including fibers made from suitable polymers such as, for example, polyesters, polyolefins, nylons, aramids, poly(phenylene sulfide), and suitable non-glass ceramics such as, for example, silicon carbide (SiC) and boron nitride.

The glass fibers may be formed from any type of glass suitable for a particular application and/or desired product specifications, including conventional glasses. Non-exclusive examples of glass fibers include A-type glass fibers, C-type glass fibers, G-type glass fibers, E-type glass fibers, S-type glass fibers, E-CR-type glass fibers (e.g., Advantex® glass fibers commercially available from Owens Corning), R-type glass fibers, wool glass fibers, biosoluble glass fibers, and combinations thereof, which may be used as the reinforcing fibers. In some exemplary embodiments, the glass fibers are durable in an acidic environment.

The non-woven fiber mat may comprise a single mat, or more than one mat, e.g., two, three, four, or five mats, which may be employed in a single lead-acid battery. Each non-woven fiber mat may comprise a single layer, or may be composed of more than one layer, e.g., two, three, four, or five layers. In some exemplary embodiments, the non-woven fiber mat comprises a non-woven glass fiber pasting mat. In some exemplary embodiments, the non-woven fiber mat comprises a non-woven glass fiber retainer mat.

In some exemplary embodiments, the glass fibers have a diameter that is at least 0.2 microns, such as from about 0.2 microns to about 30 microns. In some exemplary embodiments, the glass fibers have a diameter from about 1 micron to about 25 microns, or from about 6 microns to about 23 microns.

Glass fibers may be formed by drawing molten glass into filaments through a bushing or orifice plate and applying a sizing composition to the filaments. The sizing composition provides protection to the fibers from interfilament abrasion and promotes compatibility between the glass fibers and the matrix in which the glass fibers are to be used. After the sizing composition is applied, the fibers may be gathered into one or more strands and wound into a package or, alternatively, the fibers may be chopped while wet and collected. The collected chopped strands may then be dried and optionally cured to form dry chopped fibers or they can be packaged in their wet condition as wet chopped fibers.

In some exemplary embodiments, the sizing compositions used to coat glass fibers are aqueous-based compositions, such as suspensions or emulsions. The suspension or emulsion has a solids content that may be composed of one or more of a film former, a coupling agent, a lubricant, and a surfactant. A film former may work to hold individual filaments together to form fibers, and protect the filaments from damage caused by abrasion. Acceptable film formers include, for example, polyvinyl acetates, polyurethanes, modified polyolefins, polyesters epoxides, and mixtures thereof. A coupling agent may be included in a sizing composition to enhance the adhesion of the sizing compositions with matrix material when forming a composite, to improve the composite properties. In some exemplary embodiments, the coupling agent is an organofunctional silane.

Additional additives may be included in the sizing compositions, depending on the intended application. Such additives include, for example, anti-statics, wetting agents, antioxidants, and pH modifiers.

The non-woven glass fiber mat may be produced using either continuous or chopped fiber strands, or a combination of continuous and chopped fiber strands. The chopped fiber strands have lengths that may vary depending on a particular process and/or application. In some exemplary embodiments, the chopped fibers have a length of about 3 to about 60 mm.

The non-woven glass fiber mats may be formed in accordance with any of the known methods for producing glass fiber mats, such as, for example, dry-laid processing and wet-laid processing. In a dry-laid process, fibers are chopped and air blown onto a conveyor and a binder is then applied and dried and/or cured to form a mat. Dry-laid processes may be particularly suitable for the production of highly porous mats having bundles of glass fibers. In a wet-laid process, a water slurry "white water" is provided into which glass fibers are dispersed. The white water may contain dispersants, viscosity modifiers, defoaming agents, or other chemical agents. The slurry containing the glass fibers is then deposited onto a moving screen and a substantial amount of the water is removed therefrom. A binder may then be applied to the deposited fibers, after which heat is applied to remove any remaining water and to cure the binder thereby forming a non-woven glass fiber mat.

The binder may be any type of binder composition, such as an acrylic binder, a styrene acrylonitrile binder, a styrene butadiene rubber binder, a urea formaldehyde binder, an epoxy binder, a polyurethane binder, a phenolic binder, a polyester binder, or a mixture thereof. Exemplary acrylic binders may include, for example, polyacrylic acid, ethylacrylate, methacrylate, methylmethacrylate, styrene acrylate, and mixtures thereof. In some exemplary embodiments, the binder is a thermoset acrylic binder formed of polyacrylic acid and at least one polyol, such as for example, triethanolamine or glycerine. The binder may optionally contain one or more additional components for improved processibility and/or product performance, such as dyes, oils, fillers, colorants, UV stabilizers, coupling agents (e.g., aminosilanes), lubricants, wetting agents, surfactants, and/or antistatic agents.

In some exemplary embodiments, the binder comprises about 1 to about 30 weight percent of the total dry weight of the glass fiber mat. In other exemplary embodiments, the binder comprises about 8 to about 25 weight percent of the total dry weight of the glass fiber mat. In some exemplary embodiments, the binder comprises about 18 to 25 weight percent of the total dry weight of the glass fiber mat.

Rechargeable batteries have both a theoretical decomposition voltage and an effective decomposition voltage at which point the decomposition of water begins. The effective decomposition voltage is usually higher than the theoretical decomposition voltage and depends on the electrode material used. The difference between the theoretical and effective decomposition voltages is known as the battery's overpotential. Lead is known for its high hydrogen overpotential, such that reactions, including the transformation of lead sulphate to lead, occur easier than the water decomposition. However, grids are often made of lead alloys consisting of noble metal mixtures like calcium, antimony, silver, tin, etc., which have very low overpotential, such that a high level of hydrogen gas can evolve at the same potential difference.

In some exemplary embodiments, the non-woven glass fiber mats are treated with one or more additives that are capable of shifting the hydrogen overpotential for gassing on the negative plate from reactions with the noble metals and, thus, suppressing hydrogen evolution. The additive may be included as an additive to the sizing composition, an additive to the binder composition, or as an additive to both the sizing and binder compositions. In some exemplary embodiments, the non-woven mat is a pasting mat, such that by including the additives in the pasting mat, via the sizing and/or binder composition, the additives may be delivered directly to the surface of the electrodes, particularly the negative electrode, where the additives may directly influence the electrode surface reactions, thereby shifting the hydrogen gassing potential of the negative electrode and reducing the side reactions that cause gassing.

In some exemplary embodiments, the additives include one or more organic compounds, such as rubber additives, rubber derivatives, aldehydes, aldehyde derivatives, metal salts, fatty alcohol ethyoxylates (alkoxylated alcohols with terminal OH group), ethylene-propylene oxide block copolymers, sulphate esters (alkylsulphates and alkylether sulphates), sulphonate esters (alkyl and olefin sulphonates), phosphate esters, sulphosuccinates, polyacrylic acid, polyaspartic acid, perfluoroalkylsulfonic acid, polyvinylalcohol, lignin, lignin derivatives, phenol formaldehyde resin, cellulose, and wood flour.

In some exemplary embodiments, the additives comprise about 0.1 to about 30 weight percent of the non-woven fiber mat. In other exemplary embodiments, the additives comprise about 3.0 to 25 weight percent of the non-woven fiber mat.

In some exemplary embodiments, the binder itself may act as an additive capable of influencing the surface of the electrodes. For example, a polyacrylic acid binder may also be capable of shifting the hydrogen overpotential for gassing on the negative plate by reacting with the noble metals and suppressing hydrogen evolution. Accordingly, in some exemplary embodiments, the "additives" may comprise all or substantially all of the binder composition.

By incorporating the additives directly into the sizing composition and/or into the binder composition, the additives are directly exposed to the surface of the lead alloy grids. The additives have a limited solubility in the acid electrolyte and are released slowly during use once the non-woven fiber mat is in the acid electrolyte and the plates become active. Utilizing the non-woven fiber mat as a pasting mat allows for the slow release of the active compounds from the pasting mat provides the additives with direct contact with the surface of the electrode. The solubility of the additives may be affected by the temperature, and fairly high temperatures are reached in battery formation. The high temperatures may initiate leaching from the pasting mat to the surface of the negative electrode.

Organic additives are prone to oxidation, which is undesirable as it may destroy their ability to react with the noble metals, and their oxidation products may be harmful for the battery. Oxidation mainly takes place at the positive plate because lead dioxide ($PbO_2$) is a very strong oxidizer, especially in combination with sulphuric acid. By applying the organic additives to the negative plate via the non-woven pasting mat, the distance to the positive plate is maximized and the organic active compounds have a lower risk of oxidation at the positive plate compared to applications that introduce chemistries directly into the electrolyte.

The additives are released slowly during use once the non-woven fiber mat is in the electrolyte acid and the plates become active. In some exemplary embodiments, the additives leach out of the non-woven fiber mat and are capable of reacting with the noble metals in the lead alloy grid of the negative plate, which ensures that the molecules are unavailable for side reactions that lead to gassing. The reactions shift the hydrogen gassing potential to a higher overpotential. In some exemplary embodiments, the use of the additives in the sizing and/or binder composition shifts the hydrogen gassing potential of the negative plate by at least −30 mV, or at least −50 mV, or at least −80 mV. In some exemplary embodiments, the inclusion of the additives shifts the hydrogen gassing potential by at least −100 mV. By increasing the overpotential of the battery cell, the amount of current that is consumed when perpetuating the water decomposition reactions is significantly lessened. Thus, a battery can benefit from using an entire charge, which further improves the life of the battery.

In some exemplary embodiments, treating the electrode surface with water-loss reducing additives by incorporating the additives into the sizing composition and/or binder composition of a pasting mat demonstrates an improvement in life cycle of at least about 10%, or at least about 25%, over otherwise similar lead-acid battery cells that either have no pasting mat or include a cellulose-based pasting mat.

The process of preparing a lead-acid battery comprises forming one or more battery cells, which each include a positive plate electrode having a first face and a second face, opposite the first face, a negative plate electrode having a first face and a second face, opposite the first face, and a separator disposed therebetween. The positive electrode includes a grid containing lead alloy material. A positive active material, such as lead dioxide, is coated on the grid of the positive electrode. The negative plate electrode also includes a grid of lead alloy material that is coated with a negative active material, such as lead. The positive and negative plate electrodes are immersed in an electrolyte that may include sulfuric acid and water. The separator may be positioned between the positive and negative plate electrodes to physically separate the two electrodes while enabling ionic transport.

The non-woven fiber pasting mat disclosed herein may be positioned to partially or fully cover at least one surface of the negative plate electrode. In some exemplary embodiments, pasting mats are positioned on each side of the negative plate electrode. In some exemplary embodiments, the use of glass fibers in the non-woven pasting mat provides added dimensional stability to the negative plates during charge and discharge. During discharge, the negative plates generally increase in volume and then shrink significantly during a charging cycle, due to the different crystals formed. The improved dimensional stability provided by the glass fiber pasting mat reduces the expansion and/or shrinkage, which in turn leads to an improved battery life by preventing active mass from shedding from the grid and maintaining good contact between the active material and the grid to guarantee charge acceptance and current flow. In some exemplary embodiments, a non-woven fiber pasting mat is positioned to partially or fully cover at least one surface of the positive plate, to function as a retainer by holding the active material in place on the positive plate while also providing improved dimensional stability. In some exemplary embodiments, pasting mats are positioned on each side of the positive plate electrode. In some exemplary embodiments, non-woven fiber pasting mats are positioned on both sides of each of the positive and negative plates.

In other exemplary embodiments, the non-woven fiber mat functions as a retainer mat and is positioned in contact with at least one side of the separator.

In some exemplary embodiments, incorporation of additives in the sizing and/or binder composition as disclosed herein improves the electrical resistance of the pasting mat. The electrical resistance is the ionic resistance a mat generates when placed in a certain density of sulphuric acid.

The following examples are meant to better illustrate the present invention, but are not intended to limit the general inventive concepts in any way.

EXAMPLES

Example 1

Comparative Examples 1-4 include conventional pasting mats prepared without the use of the water-loss reducing additives disclosed herein. The mat of Comparative Example 1 was formed using cellulose fibers. The mat of Comparative Example 2 was formed using microglass. The mat of Comparative Example 3 was formed as a glass non-woven mat, comprising chopped fibers with a larger diameter than the microglass. The glass fiber diameter may be in the range of 6 μm to 16 μm and the fibers are bonded with an acid resistant acrylic based binder. The mat of Comparative Example 4 was formed using polyester fibers made via a wet-laid process or spunbond process.

Examples 1-6 comprise pasting mats formed in accordance with embodiments of the present invention. The mat of Example 1 was formed using a 50:50 mixture of 6.5 μm-6 mm and 11 μm-12 mm glass fibers bonded with carboxylated styrene butadiene latex. The final weight of the mat was 27 g/m$^2$ and comprised about 18 weight percent binder.

The mat of Example 2 was formed using 13 μm-18 mm glass fibers bonded with a nonionic, self-crosslinking acrylic polymer. A block copolymer of polypropyleneglycol and polyethyleneglycol (approximately 0.04 g/m$^2$) was added to the binder. The final mat weight was 31 g/m$^2$.

The mat of Example 3 was formed using 11 μm-13 mm glass fibers bonded with a self-crosslinking acrylic polymer. The final weight of the mat was 28 g/m$^2$ and comprised about 20 weight percent binder. An aldehyde, particularly vanillin, was added to the binder, around 1 g/m$^2$.

The mat of Example 4 was formed using a 50:50 mixture of 6.5 μm-6 mm and 11 μm-12 mm glass fibers bonded with an acrylic polymer to form a base mat having a weight of 26 g/m$^2$. This base mat was then treated with a polyacrylic acid solution to a final weight of 34 g/m$^2$.

The mat of Example 5 was formed using a 50:50 mixture of 6.5 μm-6 mm and 11 μm-12 mm glass fibers bonded with an acrylic polymer to form a base mat having a weight of 26 g/m$^2$. This base mat was then treated with a polyaspartic acid solution to a final weight of 31 g/m$^2$.

The mat of Example 6 was formed using 11 μm-30 mm glass fibers bonded with a self-crosslinking acrylic polymer binder. The final pasting mat had a weight of 27 g/m$^2$ and comprised about 20 weight percent binder. A lignosulphonate was added to the binder, around 2 g/m$^2$.

Each of the pasting mats described above was submitted to an acid extraction process (24 hours, 70° C., and acid density of 1.21 g/cm$^3$). The extraction acid was then used to record the cyclic voltammogram and hydrogen potential shift. The results are listed below in Table 1.

TABLE 1

| | Exemplary Pasting Mats. | | | | | |
|---|---|---|---|---|---|---|
| Pasting mat | Additive | Weight (g/m$^2$) | Binder weight percent | Thickness (mm) | Tensile strength (N/50 mm) | Hydrogen shift potential (mv) |
| Comparative Example 1 | Cellulose | — | 13 | — | 0.05 | 30 | −50 |

TABLE 1-continued

Exemplary Pasting Mats.

| | Pasting mat | Additive | Weight (g/m$^2$) | Binder weight percent | Thickness (mm) | Tensile strength (N/50 mm) | Hydrogen shift potential (mv) |
|---|---|---|---|---|---|---|---|
| Comparative Example 2 | Microglass | — | 25 | 30 | 0.16 | 16 | 13 |
| Comparative Example 3 | Glass | — | 22 | 35 | 0.17 | 70 | −12 |
| Comparative Example 4 | polyester | — | 25 | 100 | 0.05 | 35 | −5 |
| Example 1 | Glass | — | 27 | 18 | 0.22 | 87 | −33 |
| Example 2 | Glass | Block copolymer of polypropyleneglycol and polyethyleneglycol | 31 | 19 | 0.23 | 62 | −107 |
| Example 3 | Glass | Aldehyde (vanillin) | 28 | 20 | 0.23 | 65 | −108 |
| Example 4 | Glass | Polyacrylic acid | 34 | 19 | 0.2 | 80 | −118 |
| Example 5 | Glass | Polyaspartic acid | 32 | 18 | 0.2 | 72 | −92 |
| Example 6 | Glass | lignosulphonate | 27 | 20 | 0.21 | 70 | −30 |

The results of Table 1 illustrate the hydrogen potential shift that occurs when the water-loss reducing additives disclosed herein are included in the sizing and/or binder composition of the non-woven fiber pasting mats.

Example 2

The evolution of hydrogen gas was tested by screening how different types of pasting mats effect the hydrogen potential using cyclic voltammetry. During cyclic voltammetry, a working electrode potential is ramped linearly versus time. When the working electrode reaches a set potential, the electrode's potential ramp is inverted. The current at the working electrode is then plotted versus the applied voltage to give the cyclic voltammogram trace.

Exemplary pasting mats were subjected to an acid extraction procedure to assure leaching of the active ingredients. The measurements were carried out in a glass vessel with a three electrode arrangement (i.e., a working electrode, a reference electrode, and counter electrode). The temperature was held at 23° C. The reference electrode was an Hg/HgSO$_4$ electrode and all potentials reported were with respect to this electrode. The electrolyte used in each example was sulphuric acid with a density of 1.21 g/cm$^3$.

Figure 1:
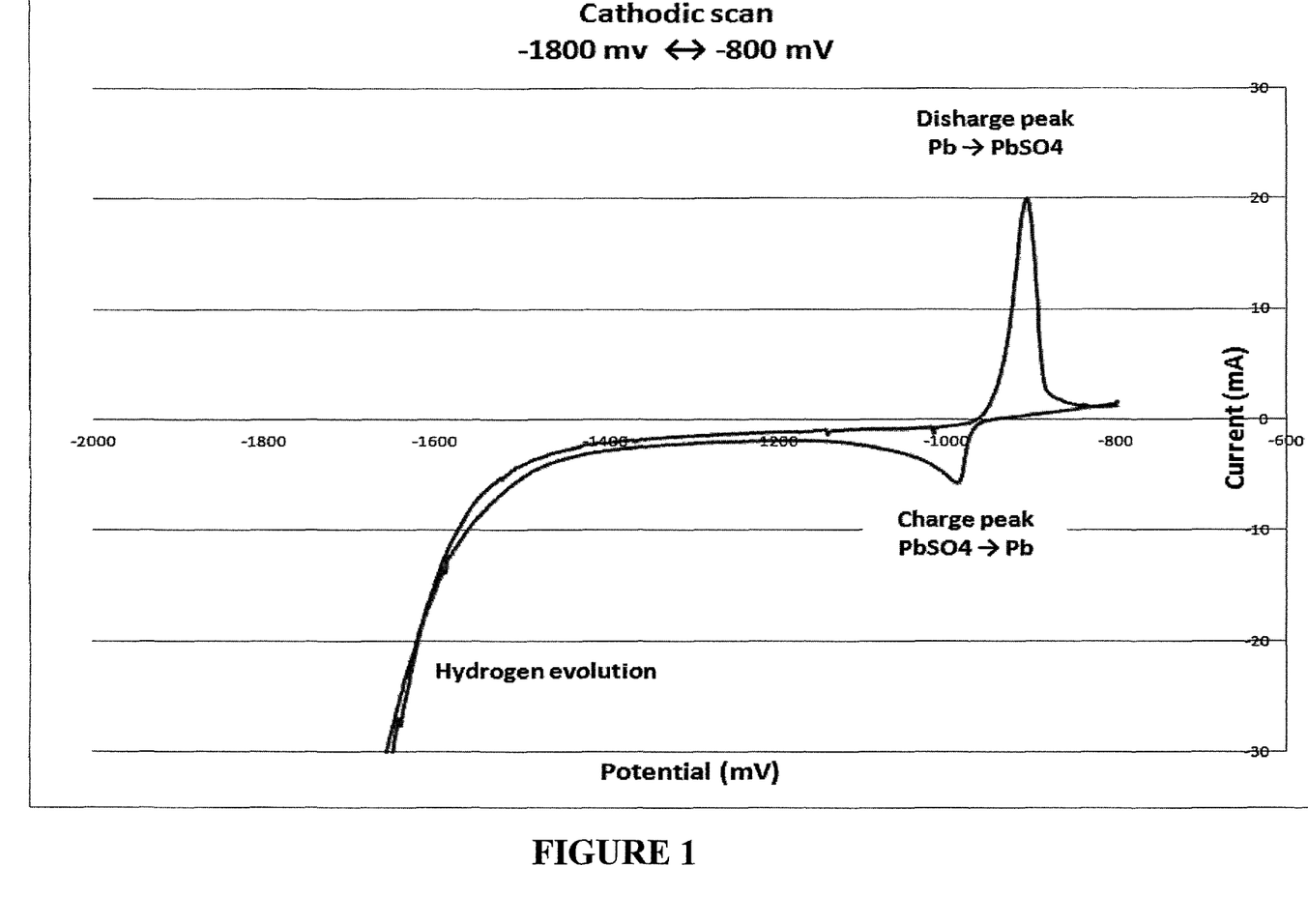
FIG. 1 illustrates a voltammogram graph produced from a pure acid electrolyte and a pure Pb working electrode.

FIG. 1 illustrates a typical voltammogram graph produced from a pure acid electrolyte and a pure Pb working electrode. The voltammogram illustrates the different electrode reactions that take place at the electrode/electrolyte interface. The anodic peak at −0.88 mV and the cathodic peak at around −0.98 mV are characteristic for the lead oxidation and lead sulphate reduction respectively. The increase in cathodic current at more negative potentials starting around −1.400 mV is attributed to the evolution of hydrogen.

Figure 2:
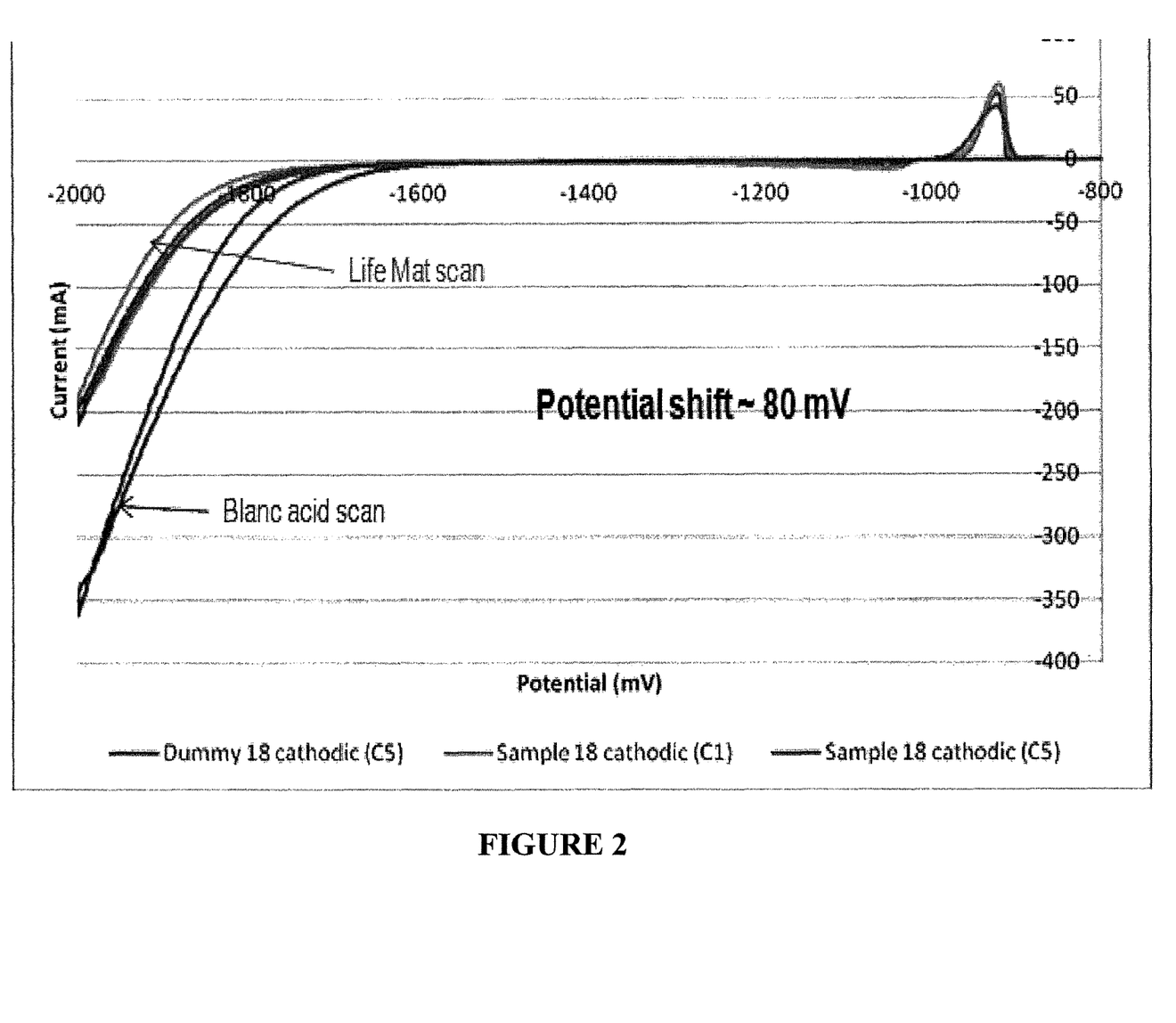
FIG. 2 illustrates a voltammogram of the potential shift that occurs when additives are extracted from a pasting mat via the acid electrolyte.
Figure 3:
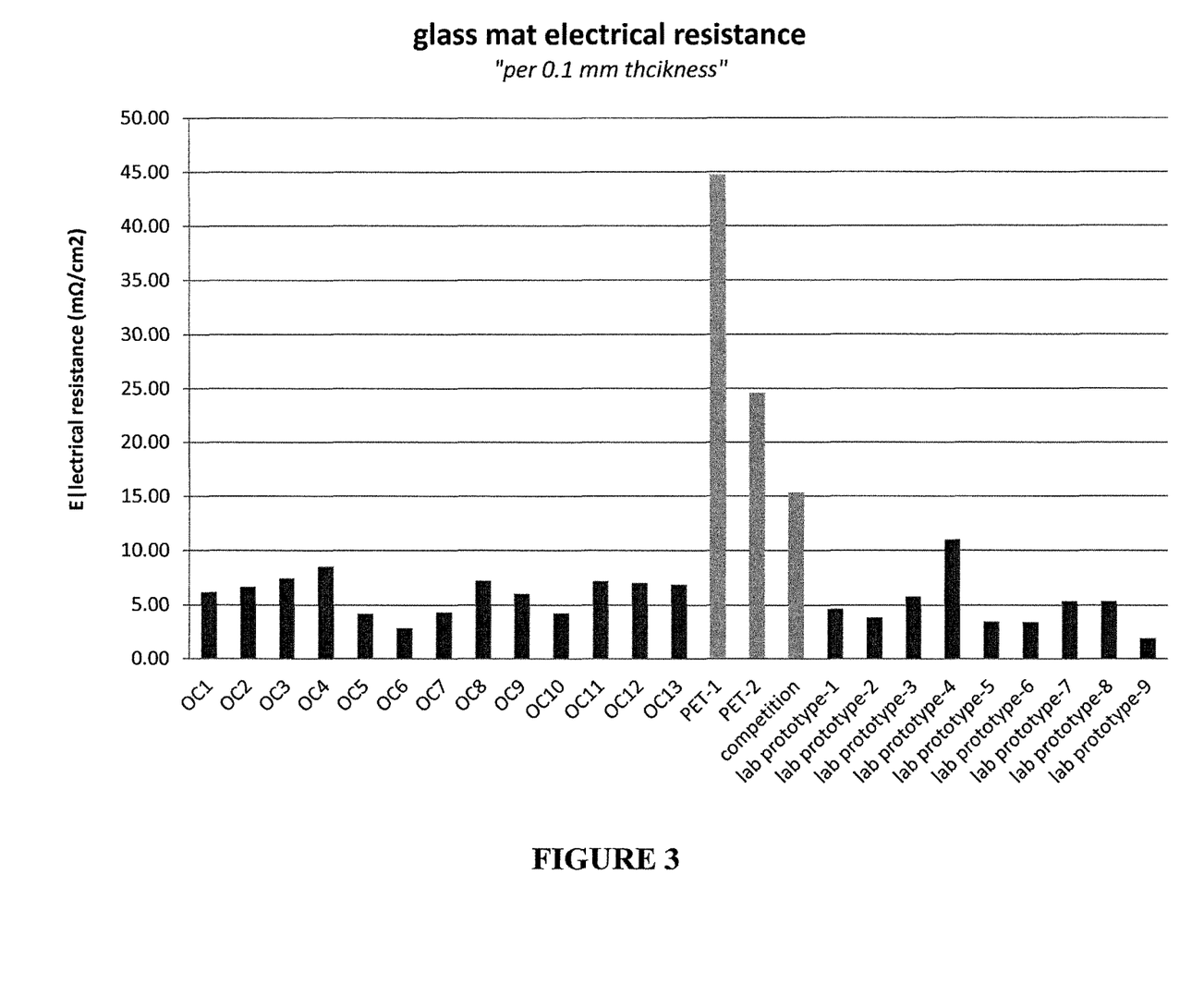
FIG. 3 graphically illustrates the electrical resistance normalized over 0.10 mm thickness for exemplary non-woven fiber mats prepared in accordance with the present invention.

FIG. 2 illustrates a voltammogram of the potential shift that occurs when additives are extracted from a pasting mat via the acid electrolyte. As illustrated in FIG. 2, the additives in the inventive pasting mat (labeled Life Mat and containing fatty alcohol ethyoxylates additives) shift the hydrogen potential about −80 mV compared to a comparable pasting mat that does not include additives as described herein.

Example 2

A variety of non-woven fiber pasting mats were prepared to have various fiber types, weights, and thicknesses. Table 2 below illustrates the properties of these mats.

TABLE 2

Properties of Fiber Mats.

| Sample | Fiber type | Weight (grams/m$^2$) | Thickness (mm) | air permeability (l/m$^2$s) | LOI measured (%) | Electrical Resistance (per .01 mm) | ER/ 0.1 mm |
|---|---|---|---|---|---|---|---|
| 1 | glass | 25.1 | 0.19 | 7420 | 12.0 | 11.7 | 6.17 |
| 2 | glass | 22.9 | 0.205 | 6780 | 21.1 | 13.7 | 6.66 |
| 3 | glass | 24.6 | 0.22 | 8330 | 16.5 | 16.3 | 7.43 |
| 4 | glass | 24.2 | 0.165 | 5190 | 18.9 | 14.1 | 8.53 |
| 5 | glass | 131.5 | 0.9 | 2400 | 14.1 | 37.8 | 4.20 |
| 6 | glass | 105.3 | 0.95 | 4420 | 15.7 | 27.1 | 2.85 |
| 7 | glass | 117.3 | 0.84 | 2400 | 14.7 | 36.7 | 4.36 |
| 8 | glass | 23.8 | 0.19 | 6930 | 23.0 | 13.8 | 7.24 |
| 9 | glass | 23.5 | 0.2 | 7650 | 11.9 | 12.0 | 6.02 |
| 10 | glass | 84.5 | 0.61 | 3130 | 15.9 | 26.0 | 4.26 |
| 11 | glass | 53.8 | 0.42 | 4020 | 17.8 | 30.1 | 7.16 |
| 12 | glass | 39.7 | 0.33 | 5130 | 18.9 | 23.1 | 7.01 |
| 12 | glass | 69.1 | 0.38 | 1790 | 18.2 | 26.0 | 6.85 |
| 13 | glass | 48.2 | 0.42 | 4246 | 11.6 | 19.6 | 4.66 |
| 14 | glass | 41.8 | 0.4 | 4488 | 18.8 | 15.4 | 3.84 |
| 15 | glass | 47.5 | 0.42 | 4114 | 27.9 | 24.3 | 5.78 |
| 16 | glass | 51 | 0.42 | 3982 | 33.5 | 46.2 | 11.01 |
| 17 | glass | 40.3 | 0.41 | 5104 | 16.9 | 14.2 | 3.46 |

TABLE 2-continued

Properties of Fiber Mats.

| Sample | Fiber type | Weight (grams/m²) | Thickness (mm) | air permeability (l/m²s) | LOI measured (%) | Electrical Resistance (per .01 mm) | ER/ 0.1 mm |
|---|---|---|---|---|---|---|---|
| 18 | glass | 43.7 | 0.41 | 4378 | 19.4 | 14.0 | 3.41 |
| 19 | glass | 43.6 | 0.41 | 3740 | 20.1 | 22.0 | 5.37 |
| 20 | glass | 50.1 | 0.41 | 1606 | 19.8 | 21.8 | 5.33 |
| 21 | glass | 39.6 | 0.4 | 5786 | 15.4 | 7.7 | 1.94 |
| Comparative Example-1 | polyester | 25 | 0.06 | 1570 | 100.0 | 26.9 | 44.77 |
| Comparative Example-2 | polyester | 18.5 | 0.08 | 2850 | 100.0 | 19.7 | 24.59 |
| Comparative Example-3 | glass | 19.5 | 0.17 | 5540 | 38.0 | 26.1 | 15.37 |

As illustrated in Table 2, the electrical resistance for the non-woven fiber mats was lowest for glass fiber mats prepared in accordance with the present invention. The electrical resistance, when normalized over 0.10 mm thickness, is lowest for the non-woven glass fiber mats prepared in accordance with the present invention. Each of samples 1-21 demonstrates electrical resistance, normalized over 0.1 mm, of lower than 15/0.1 mm. In some exemplary embodiments, the glass fibers may have an electrical resistance of less than 10/0.1 mm. The normalized electrical resistances of the examples illustrated in Table 2 are further compared in FIG. 1, which shows that each of the non-woven glass fiber mats formed according to the present invention (OC1-13 and lab examples) demonstrates an electrical resistance normalized over 0.1 mm that is far less than 15.

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within the generic disclosure. The general inventive or otherwise apparent concepts are not otherwise limited, except for the recitation of the claims set forth below.

The invention claimed is:

1. A non-woven fiber pasting mat comprising:
   a plurality of fibers coated with a sizing composition and arranged to form a non-woven mat, wherein the sizing composition comprises a film former selected from the group consisting of polyvinyl acetates, polyurethanes, modified polyolefins, polyesters epoxides, and mixtures thereof;
   a binder composition impregnating said non-woven mat, wherein said binder composition is selected from the group consisting of an acrylic binder, a styrene acrylonitrile binder, a styrene butadiene rubber binder, a urea formaldehyde binder, an epoxy binder, a polyurethane binder, a phenolic binder, a polyester binder, and mixtures thereof; and
   one or more additives distinct from the binder composition and included in at least one of said sizing composition and said binder composition, said one or more additives including one or more of aldehyde, metal salts, fatty alcohol ethyoxylates, ethylene-propylene oxide block copolymers, sulphate esters, sulphonate esters, phosphate esters, sulphosuccinates, polyacrylic acid, perfluoroalkylsulfonic acid, polyvinylalcohol, lignin, lignin derivatives, phenol formaldehyde resin, cellulose, and wood flour,
   wherein said one or more additives are operable to reduce water loss in a lead-acid battery.

2. The non-woven fiber pasting mat of claim 1, wherein said fibers comprise one or more of glass fibers, polyester fibers, polyolefin fibers, nylon fibers, aramid fibers, poly (phenylene sulfide) fibers, carbon fibers, silicon carbide (SiC) fibers, boron nitride fibers, and combinations thereof.

3. The non-woven fiber pasting mat of claim 2, wherein said fibers comprise glass fibers.

4. The non-woven fiber pasting mat of claim 3, wherein said glass fibers have an average diameter of about 0.2 microns to about 30 microns.

5. The non-woven fiber pasting mat of claim 3, wherein said glass fibers have an average diameter of about 1 micron to about 25 microns.

6. The non-woven fiber pasting mat of claim 3, wherein said glass fibers are chopped fibers having an average length of between about 3 mm and about 60 mm.

7. The non-woven fiber pasting mat of claim 1, wherein said binder composition is an acid resistant binder.

8. The non-woven fiber pasting mat of claim 1, wherein said one or more additives comprise about 0.1 weight percent to about 30 weight percent of the non-woven fiber pasting mat.

9. The non-woven fiber pasting mat of claim 1, wherein said one or more additives include one or more of ethylene-propylene oxide block copolymers, aldehydes, polyacrylic acid, and polyaspartic acid.

10. The non-woven fiber pasting mat of claim 1, wherein said non-woven fiber pasting mat has an electrical resistance of less than about 15 mΩ/cm² per 0.1 mm thickness of the non-woven fiber pasting mat.

11. The non-woven fiber pasting mat of claim 1, wherein said non-woven fiber pasting mat has an electrical resistance of less than 10 mΩ/cm² per 0.1 mm thickness of the non-woven fiber pasting mat.

* * * * *